United States Patent [19]

Hendrickson

[11] 4,118,017
[45] Oct. 3, 1978

[54] SHAFT FURNACE DESIGN

[75] Inventor: Luther G. Hendrickson, Churchill Borough, Pa.

[73] Assignee: United States Steel Corporation, Pittsburgh, Pa.

[21] Appl. No.: 646,137

[22] Filed: Jan. 2, 1976

[51] Int. Cl.² ............................................. C21B 11/02
[52] U.S. Cl. .................................... 266/187; 266/197
[58] Field of Search ............................ 75/5, 7, 33–37; 266/186, 187, 189, 197, 144, 156, 168, 171, 176, 177, 195

[56] References Cited

U.S. PATENT DOCUMENTS

| | | | |
|---|---|---|---|
| 2,152,687 | 4/1939 | Greenawalt | 75/7 |
| 2,345,067 | 3/1944 | Osann | 266/197 |
| 2,532,335 | 12/1950 | Royster | 75/5 |
| 2,670,946 | 3/1954 | Royster | 266/187 |
| 2,693,409 | 11/1954 | Stephens | 266/156 |
| 2,931,720 | 4/1960 | De Vaney | 75/35 |
| 3,836,131 | 9/1974 | Beggs | 266/195 |
| 3,850,616 | 11/1974 | Cruse | 75/34 |

FOREIGN PATENT DOCUMENTS

| | | | |
|---|---|---|---|
| 1,057,341 | 3/1959 | Fed. Rep. of Germany | 266/197 |

*Primary Examiner*—Gerald A. Dost
*Attorney, Agent, or Firm*—John F. Carney

[57] ABSTRACT

Method and apparatus are described for the controlled cooling of processed oxidic ores in a shaft furnace in order to produce an improved product. Means are provided in the cooling section of the furnace chamber that enable the chamber to be divided into separate regions within each of which the admission of low temperature reducing gas can be regulated in order to more effectively control the distribution of reducing gas across the furnace.

2 Claims, 6 Drawing Figures

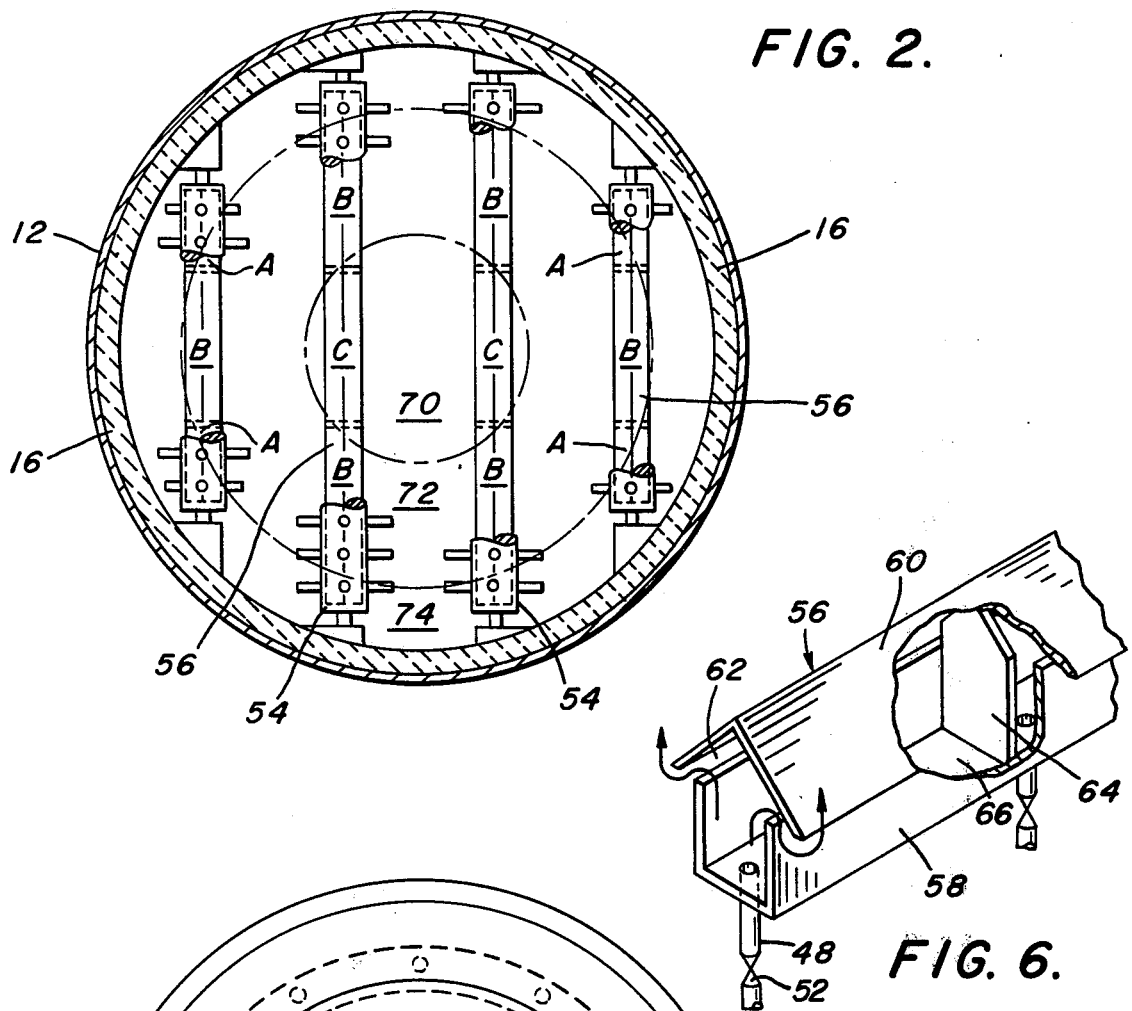
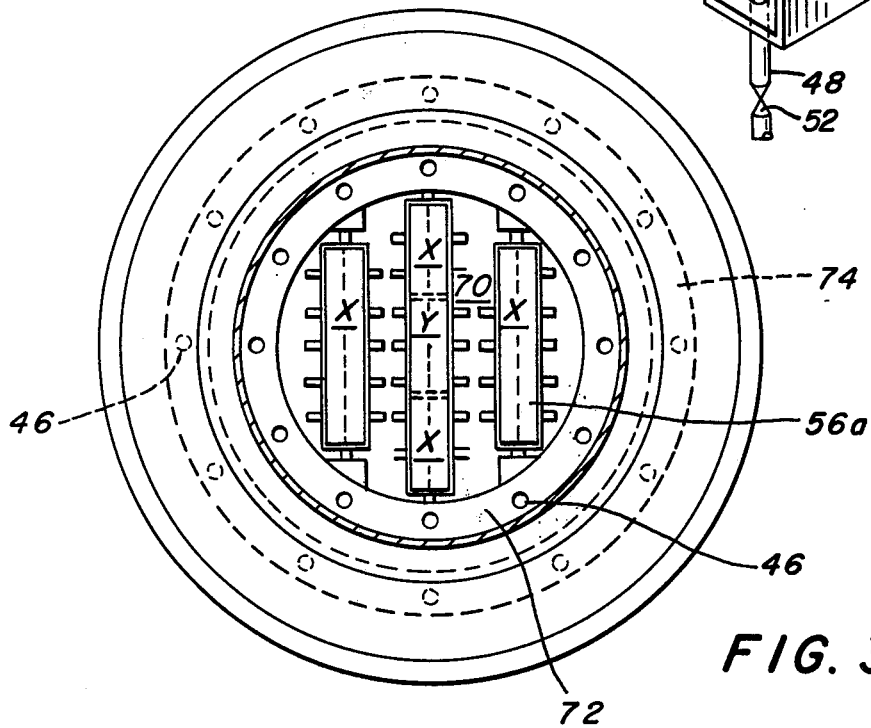

SHAFT FURNACE DESIGN

BACKGROUND OF THE INVENTION

It is well known that shaft furnaces are ideally suited for the direct reduction of oxidic ores notably iron ore, due to their ability to pass the ore to be reduced in countercurrent relation to the reducing gases thereby to improve the thermal efficiency of the process as well as to enhance reactant effectiveness. In these furnaces iron oxide pellets, course (lump) ore, or other iron-bearing agglomerates are reduced to iron in the solid state by the removal of as much as 95 percent or more of the contained oxygen by passing high temperature reducing gas, at about 1600° F. or higher, upwardly through the furnace counter to the downwardly descending pellets. The reducing gas is rich in both hydrogen and carbon monoxide which are each thermodynamically favorable to the reduction of iron oxide.

In U.S. pat. appln. Ser. No. 644,249, filed by S. Waslo and assigned to the assignee herein; there is described a method of operating a shaft furnace of the aforementioned type in a manner to derive an improved product that is less prone to degradation and to reoxidation. In the method described in this patent application only part of the reducing gas is admitted to the shaft furnace at an elevated temperature. The remainder is introduced at about ambient temperature and in controlled amounts to maintain the temperature of the ore in the cooling section of the furnace above a prescribed minimum temperature and for an extended period of time.

In order to obtain optimum performance in the described process, it is necessary that only so much low temperature reducing gas be admitted to the furnace chamber as is necessary for cooling the reduced product. In cases where an excessive amount of cold gas is introduced to the furnace the heating and reduction of the ore particles is adversely affected. Should an insufficient amount of cold gas be supplied the product emerging from the furnace chamber will be at undesirably high temperatures rendering the product prone to reoxidize.

In practice, therefore, it is desirable to match the heat capacity of the gas flow with the heat capacity of the reduced product to control the admission of cold reducing gas. The effective matching of these flows is difficult, if not impossible to obtain without the provision of substantially uniform gas flows across the transverse section of the furnace chamber. This latter condition is, itself, difficult to achieve due to the fact that, because the emission of high temperature gas to the heating and reducing section of the furnace is effected through tuyeres disposed in the shell wall, the gases are not immediately distributed across the furnace section the heating of the particles and reduction process attendant therewith is nonuniform across the furnace section. The problem of maldistribution of reduction gases is compounded in the lower, cooling section of the furnace by the fact that, due to viscosity considerations, the cold reducing gas admitted to the furnace chamber is attracted to the lower temperature regions thereof such that the hotter regions remain hotter. Maldistribution of reduction gases is further aggravated in this region of the furnace by reason of the fact that because solid particle flow varies from location-to-location transversely of the section there is created a concomitant variation in gas flow through the respective locations.

SUMMARY OF THE INVENTION

According to the present invention there is provided a method of reducing particulate oxidic ores in a shaft furnace by passing the ore particles in counterflow relation to the reducing gas in which part of the reducing gas is admitted to an elevated section of the furnace at a relatively high temperature and the remainder, being at a relatively lower temperature, is admitted to a lower section of the furnace with the lower temperature gas being introduced into discrete zones in the furnace that define laterally spaced flow paths across a transverse section of the furnace.

The invention further provides shaft furnace apparatus for the direct reduction of oxidic ore and particularly adapted to conduct the inventive method comprising a shaft furnace for the direct reduction of oxidic ore comprising an upstanding shell defining a chamber in which oxidic ore is reduced by intimate contact with reducing gas; means for admitting particulate ore to be reduced to the top of said chamber; means for discharging the reduced product from the bottom of said chamber; means for introducing reducing gas to said chamber for flow upwardly through said chamber, said means including means for flowing reducing gas through zones that are laterally spaced across the chamber cross section. In one aspect of the invention the means for introducing reducing gas to the chamber comprises a plurality of gas discharge openings spaced about the surface of a specially formed transition section disposed at the bottom of the furnace. In another aspect of the invention the reducing gas is introduced through ducts that are disposed closely subjacent oscillatable cluster breakers that extend across the furnace chamber. The invention further contemplates the provision of flow control means for selectively regulating the flow of reducing gas to the respective zones within the furnace chamber.

For a better understanding of the invention, its operating advantages and the specific objectives obtained by its use, reference should be made to the accompanying drawings and description which relate to a preferred embodiment thereof.

DESCRIPTION OF THE DRAWINGS

FIG. 2 is a sectional view taken along line 2—2 of FIG. 1;

FIG. 3 is a sectional view taken along line 3—3 of FIG. 1;

FIG. 6 is a perspective representation of the reducing gas duct employed in the shaft furnace of FIG. 1.

DESCRIPTION OF A PREFERRED EMBODIMENT

Figure 1:
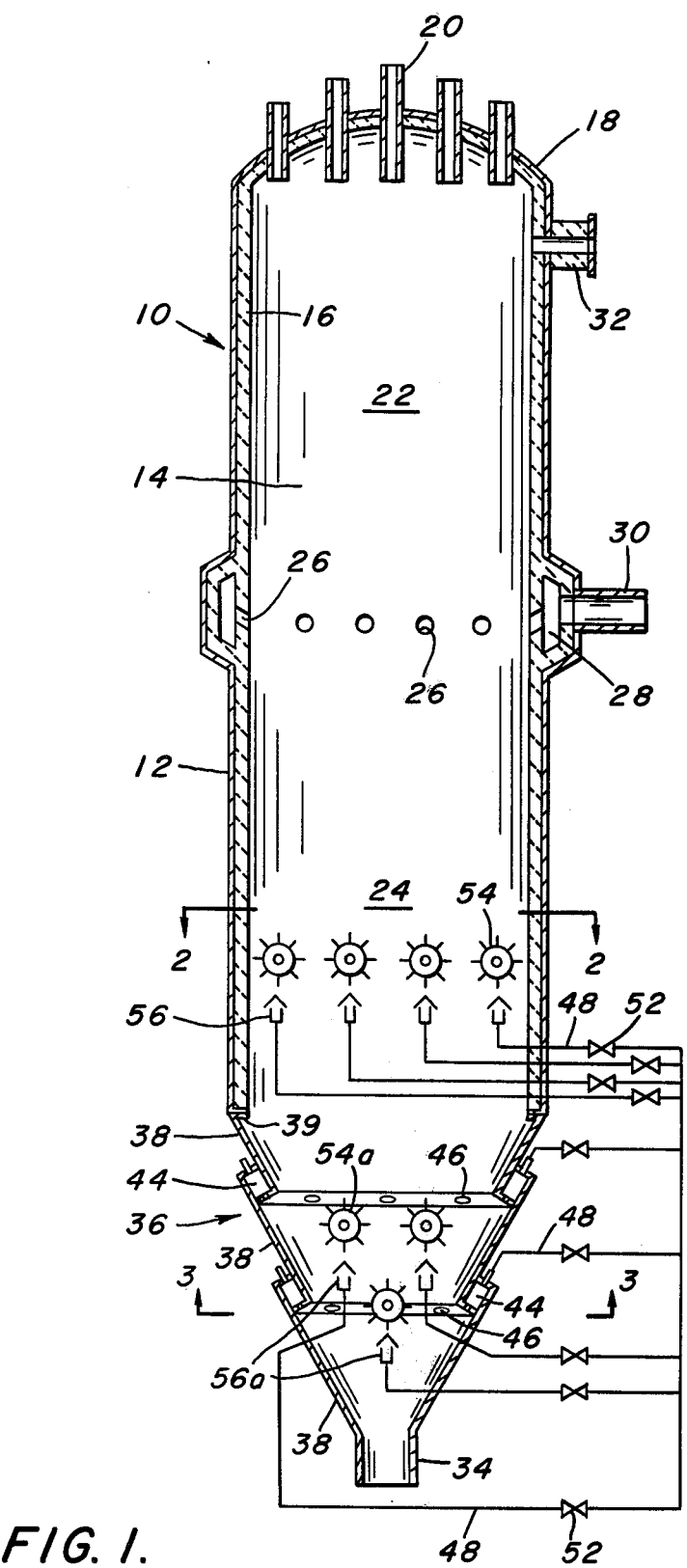
FIG. 1 is a somewhat schematic elevational section of a shaft furnace constructed according to the present invention.

FIG. 1 illustrates a shaft furnace 10 comprising a vertically disposed, cylindrical shell 12 formed of steel, or the like, and defining a chamber 14, whose interior surface is lined with refractory material 16. The upper end of the furnace chamber 14 is closed by a refractory-lined end closure 18 that is penetrated by a plurality of tubular inlets 20 for depositing ore to be reduced into the furnace chamber.

The furnace chamber 14 is divided into two vertically spaced regions, indicated as heating and reducing section 22 and cooling section 24. The junction between the two sections is defined at an intermediate level in the chamber by the location of a plurality of reducing gas inlet tuyeres 26 that are circumferentially spaced about the furnace wall. Reducing gas at an elevated temperature of about 1600° F., or more, is passed to the downwardly inclined tuyeres 26 from an annular bussle or manifold 28 which surrounds the shell 12 and which is connected to a source of gas by supply pipe 30. Spent reducing gas exits the chamber 14 through a gas outlet pipe 32 positioned adjacent its upper end.

Processed ore is discharged from the bottom of the chamber 14 through discharge conduit 34 which is disposed in substantial coaxial alignment with the shell wall but is of considerably smaller diameter than that of the latter. The discharge conduit 34 is connected to the bottom end of shell 12 by means of a downwardly convergent transition section 36 which, according to the present invention, is constructed of a plurality of telescoping conical frustums 38. The uppermost of the frustums 38 is provided with an annular flange 39 for attachment to the bottom of shell 12 and the lowermost frustum is caused to connect with the conduit 34. The surfaces of the respective frustums are desirably inclined at an angle of greater than 65°, preferably about 70°, with respect to the horizontal in order to promote the downward passage of solids through the furnace chamber.

Figure 4:
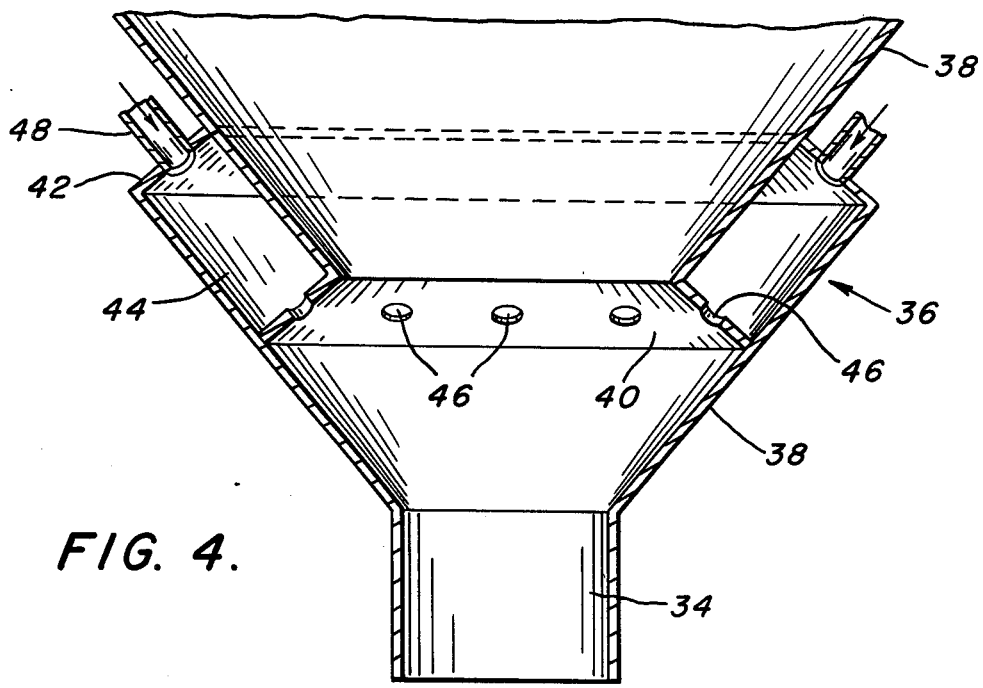
FIG. 4 is an enlarged sectional view of the bottom of the shaft furnace illustrated in FIG. 1.

As shown best in FIG. 4, the respective frustums 38 are interconnected by axially spaced, annular plates 40 and 42 which extend substantially perpendicularly between adjacent frustums and cooperate therewith to form axially spaced manifolds 44 for the delivery of cold reducing gas as hereinafter described. Plates 40 contain a plurality of circumferentially spaced openings 46 which establish gas communication between the respective manifolds and the interior of the transition section. Plates 42, on the other hand, are adapted to receive tubular supply lines 48 which connect the manifolds to a source of cold reducing gas. The respective lines 48 are each provided with flow regulating valves 52 to control the flow of reducing gas to the various furnace zones as hereinafter described.

Figure 5:
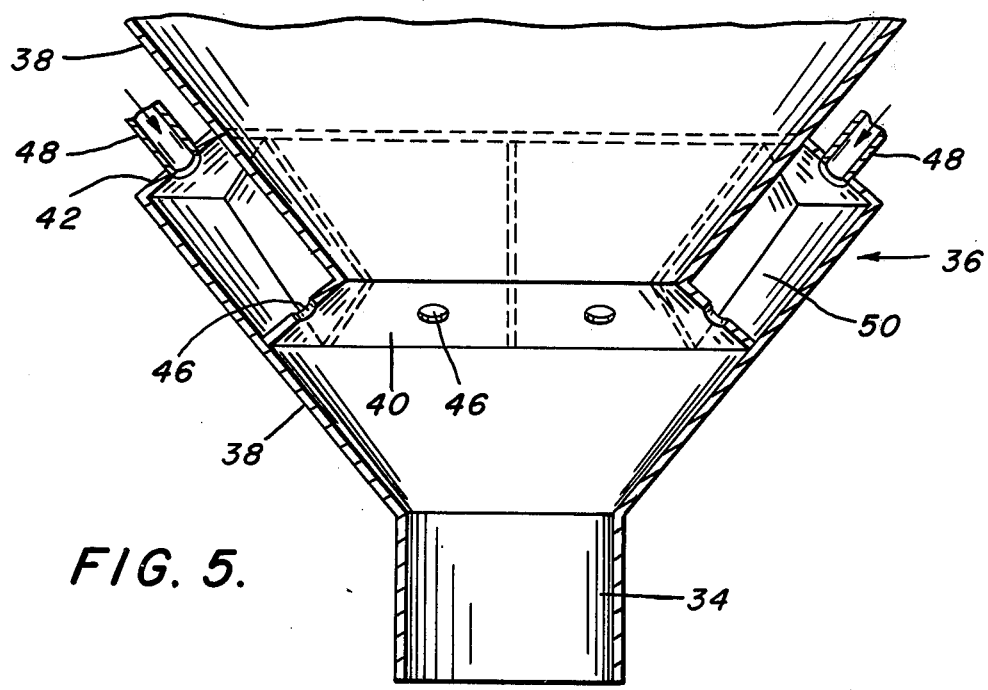
FIG. 5 is a view, similar to FIG. 4, illustrating a modified embodiment of the shaft furnace bottom.

It should be understood that, although three axially spaced frustums are described and illustrated herein, a greater or lesser number of frustums 38 and associated manifolds 44 may be employed as are necessary for the interconnection between the bottom end of the shell 12 and the discharge conduit 34 while maintaining the desired angle of inclination.

Where desired to regulate the supply of cold reducing gas circumferentially about the furnace chamber 14 the manifolds 44 may, as shown in FIG. 5, be divided by plates 50 into separate compartments containing one or more openings 46 with each compartment being served by a single supply line 48. The supply lines 48 are each provided with valves 52 to independently control the flow of gas to the various compartments.

In the described shaft furnace arrangement oscillatable cluster breakers 54 of known construction are disposed in regions of the furnace chamber 14 that are most susceptible to plugging caused by the agglomeration of processed ore particles. These regions include a location in the cooling section 24 slightly above the inlet to the transition section 36 and a location within the interior of the transition section slightly above the inlet to the discharge conduit 34. In the former location the cluster breakers 54 are laterally spaced in substantially coplanar relation across the width of the furnace chamber 14. In the latter location the cluster breakers, indicated as 54a, are disposed with their axes on a triangular pitch. In both locations cold gas inlet ducts 56 and 56a supplied by lines 48 containing flow regulating valves 52 are positioned subjacent the respective cluster breakers 54 and 54a and are substantially coextensive therewith to achieve intimate and substantially uniform contact of cooling gas with the particulate solids. The ducts 56 and 56a as illustrated in FIG. 6, are each formed by an elongated, rectangular trough 58 that is open on its top side and a top plate 60 that is coextensive with the trough 56. The top plate 60 is vertically spaced above the upper side edges of the trough to define a longitudinal opening 62 through which reducing gas is supplied to the furnace chamber. Partition plates 64 are disposed on longitudinal spacing within the duct to divide the same into separate compartments 66.

The present invention contemplates the arrangement of the cold reducing gas supply means such that the gas can be regulatably supplied to various laterally spaced zones of the furnace chamber so as to enable more uniform gas distribution transversely of the furnace chamber. Thus, as best shown in FIGS. 2 and 3 of the drawings, the transverse section of the furnace interior is divided, as shown by the phantom lines, into circumferentially extending, radially spaced concentric zones, indicated in both views as zones 70, 72 and 74, which extend vertically through the cooling section 24 of the furnace. The inner zone 70 is supplied in the lower region of the furnace by cold reducing gas from the ducts 56a. The intermediate zone 72 is supplied by gas from the openings 46 that communicate with the lowermost manifold 44 in the transition section 36 and the outer zone 74 is fed by openings 46 in the upper manifold 44. In the region of the upper cluster breakers 54 the respective zones 70, 72 and 74 are supplied with cold reducing gas from those compartments 66 indicated by the letters A, B and C, respectively, in FIG. 2. For the sake of clarity, the gas supply lines 48 and appropriate valving 52 have been omitted from the illustrations of FIGS. 2 and 3.

A description of the operation of the shaft furnace arrangement of the present invention is as follows. Particulate ore preferably is the form of pellets in admitted to the top of the shaft furnace 10 through the inlet tubes 20 to substantially fill the chamber 14. Hot reducing gas at a temperature from about 1400° F. to about 1750° F. and rich in hydrogen and carbon monoxide is admitted to the chamber 14 through tuyeres 26 with the gases being caused to flow upwardly through the body of ore in the heating and reducing section 22 and exiting the chamber through gas outlet pipe 32. In passing through the ore body the gases heat the material to the degree necessary to effect reduction of the oxide. Because the particulate material gravitates downwardly through the chamber 14 toward the discharge opening 34 the particles and the gas are disposed in counterflow relation which is highly desirable for thermodynamic and chemical reactive consideration to render the reduction process most effective. Simultaneously with the introduction of the hot reducing gas, cold reducing gas at about 70° F. to about 120° F. and representing about 25 percent of the total reducing gas admitted to the chamber 14 is passed in regulated amounts through lines 48, entering the chamber through the openings 46 associated with the annular manifolds 44 and through the inlet ducts 56 and 56a beneath the respective cluster breakers 54 and 54a. The cold reducing gases entering the chamber 14 at these several locations are, themselves, caused to flow upwardly through section 24 in counterflow relation to the process particles and mixedly unite in section 22 with the hot gases from the tuyeres 26 before exiting the chamber through gas outlet line 32. In flowing upwardly through the cooling section 24 the cold gases recover much of the sensible heat from the process particles to cool the latter such that at discharge through conduit 34 the temperature of the particles is at about 100° F. in cases where the product is discharged to the atmosphere and at a higher temperature, typically at about 400° F., in cases where the product is to be further processed such as, for example, in a passivator, or the like.

The supply of cold reducing gas into the respective zones 70, 72 and 74 through the cooling zone is monitored by appropriate monitoring means (not shown) and the gas flows to the respective zones controlled by proper manipulation of the several flow regulating valves 52. By regulating the flow of cold reducing gas that passes through the cooling section 24 of the furnace chamber a uniform distribution of gas flows can be maintained thereby to achieve uniformity in the product that is discharged from the outlet 34. Moreover, by providing the transition section 36 with longitudinally spaced and coaxially aligned gas inlet manifolds 44 cooling gas openings 46 are disposed with respect to the respective zones 70, 72 and 74 such that the flow of gas thereto can be conveniently controlled.

It will be understood tha various changes in the details, materials and arrangements of parts which have been herein described and illustrated in order to explain the nature of the invention, may be made by those skilled in the art within the principle and scope of the invention and expressed in the appended claims.

What is claimed is:

1. In a shaft furnace for the direct reduction of oxidic ore including an upstanding refractory lined, metallic shell defining a chamber in which ore is reduced by intimate contact with reducing gas, said shell having ore supply and discharge openings for passing ore by gravity from top to bottom through said chamber and a downwardly convergent transition section adjacent said ore discharge opening, high temperature reducing gas inlet means communicating with said chamber at an intermediate region thereof and effective to pass said high temperature gas in counterflow relation to the flow of ore therethrough, means for introducing cool reducing gas adjacent said ore discharge opening for flow in counterflow relation to said ore, improvement comprising means for regulatably passing said cool reducing gas through each of a plurality of concentrically spaced transverse sections of said shell, said means comprising a transition section including:
    (a) a plurality of hollow, conical frustums disposed in mutual telescoping relation depending from the lower end of said shell;
    (b) axially spaced, annular plates interconnecting said frustums and cooperating therewith to form a plurality of axially spaced annular manifolds of progressively reduced diameter extending about the periphery of said transition section,
    (c) circumferentially spaced openings in said plates establishing gas communication between said manifolds and said chamber;
    (d) circumferentially spaced partition plates in said manifolds for dividing the same into separate compartments; and
    (e) means for independently regulating the supply of cool reducing gas to each of said compartments.

2. The improvement of claim 1 further including:
    (a) a plurality of substantially linear ducts connected to a source of cool reducing gas and extending transversely of said chamber, said ducts including means forming openings establishing gas communication with said chamber;
    (b) longitudinally spaced partition means in said ducts dividing the same into separate compartments; and
    (c) flow regulating means operatively associated with each of said compartments for selectively passing cool reducing gas at regulated rates to each of said compartments.

* * * * *

UNITED STATES PATENT AND TRADEMARK OFFICE
CERTIFICATE OF CORRECTION

PATENT NO. : 4,118,017

DATED : October 3, 1978

INVENTOR(S) : Luther G. Hendrickson

It is certified that error appears in the above-identified patent and that said Letters Patent are hereby corrected as shown below:

Column 1, line 21, change "discribed" to -- described --.

Column 4, line 48, change "in" to -- is --.

Column 4, line 63, change "consideration" to -- considerations --

Column 5, line 34, change "tha" to -- that --.

Column 6, line 11, before "improvement", insert -- the --.

Signed and Sealed this

Third Day of April 1979

[SEAL]

Attest:

RUTH C. MASON
*Attesting Officer*

DONALD W. BANNER
*Commissioner of Patents and Trademarks*